United States Patent [19]
Jacob

[11] Patent Number: 5,518,446
[45] Date of Patent: May 21, 1996

[54] FUME HOOD EXHAUST TERMINAL

[75] Inventor: Steven D. Jacob, Roselle, Ill.

[73] Assignee: Landis & Gyr Powers, Inc., Buffalo Grove, Ill.

[21] Appl. No.: 282,043

[22] Filed: Jul. 28, 1994

[51] Int. Cl.$^6$ ................................................ B08B 15/02
[52] U.S. Cl. .......................... 454/61; 137/486; 137/487.5
[58] Field of Search .............................. 137/486, 487.5; 454/59, 61

[56] References Cited

U.S. PATENT DOCUMENTS

| 362,699 | 5/1943 | Wunsch | 137/486 |
|---|---|---|---|
| 1,837,382 | 12/1931 | Waller . | |
| 1,921,145 | 8/1933 | Albright | 137/486 X |
| 2,071,191 | 2/1937 | Wotring . | |
| 2,231,568 | 2/1941 | Gorrie | 137/487.5 X |
| 2,295,728 | 9/1942 | Gess | 137/486 X |
| 2,662,547 | 12/1953 | Comeau | 137/487.5 X |
| 3,759,098 | 9/1973 | Logsdon et al. . | |
| 4,394,869 | 7/1983 | Avery | 137/486 X |
| 4,706,553 | 7/1988 | Sharp et al. | 454/61 |
| 5,090,303 | 2/1992 | Ahmed . | |
| 5,115,728 | 5/1992 | Ahmed et al. . | |
| 5,141,018 | 8/1992 | Guterman | 137/375 |
| 5,174,333 | 12/1992 | Hurmi . | |
| 5,385,505 | 1/1995 | Sharp et al. | 454/61 |

FOREIGN PATENT DOCUMENTS

| 55466 | 6/1952 | France | 137/486 |
|---|---|---|---|
| 234156 | 4/1969 | U.S.S.R. | 137/486 |

*Primary Examiner*—Harold Joyce
*Attorney, Agent, or Firm*—Greer, Burns & Crain, Ltd.

[57] ABSTRACT

A fume hood exhaust terminal for monitoring and controlling gas flow in a duct system includes a tubular duct segment having an upstream end, a downstream end, and an inner periphery, as well as an annular ring secured to the inner periphery between the upstream and downstream ends. A differential pressure transmitter device is disposed on the duct segment for measuring the pressure differential across the ring and for generating a corresponding flow signal. A damper is disposed in the duct segment between the differential pressure measuring device and the downstream end, and an actuator is located on the duct segment to be responsive to the signal generated by the differential pressure transmitter device and connected to the damper for selectively controlling the position of the damper in the duct segment to maintain a specified gas flow.

11 Claims, 2 Drawing Sheets

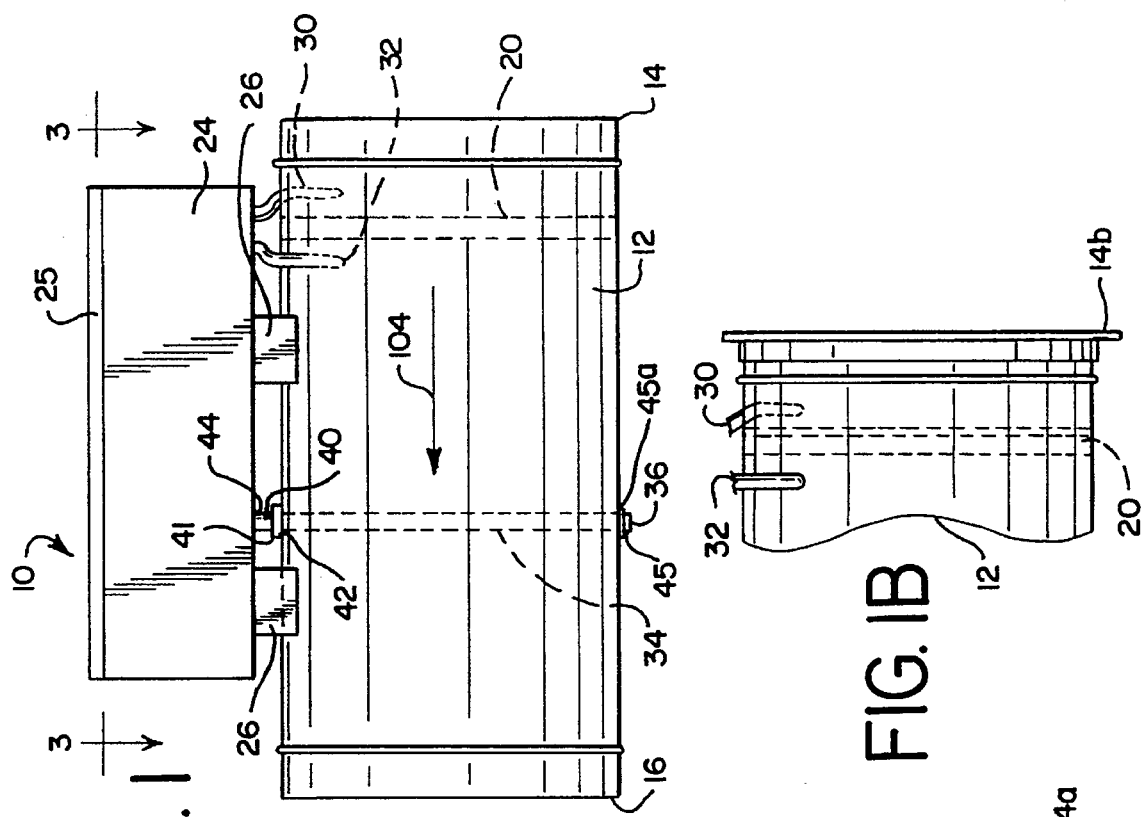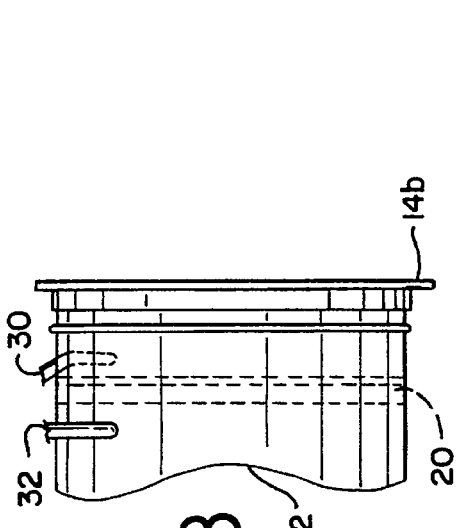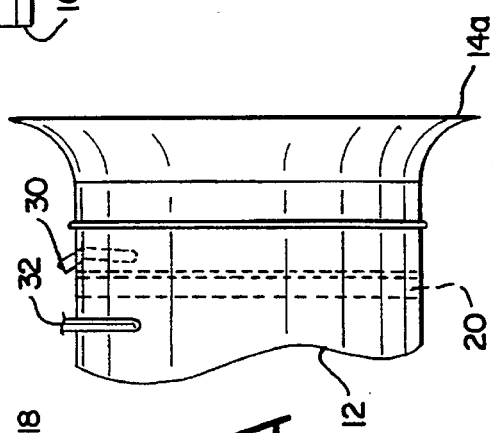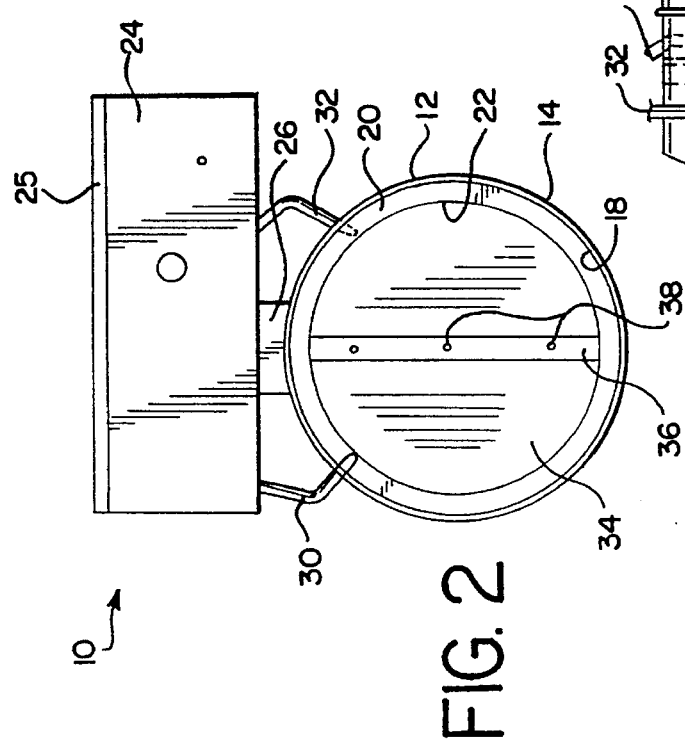

FUME HOOD EXHAUST TERMINAL

BACKGROUND OF THE INVENTION

The present invention relates to devices for monitoring and controlling the flow of air and other gaseous fluids in ducts or conduits, and specifically to a modular control device for detecting duct velocity in a laboratory fume hood and for adjusting the velocity to maintain specified values.

Fume hoods are provided in laboratories for removing noxious or toxic fumes during the running of experiments or tests which utilize or generate such fumes. Typically, the fume hood includes an enclosure with doors dimensioned so that experiments may be carried out within the confines of the fume hood. Exhaust ducting is provided to expel the air and any noxious fumes so that the laboratory technician will not be exposed to them while working near the hood.

Fume hood controllers control the flow of air through the fume hood as a function of the desired average face velocity of the effective opening of the fume hood. The average face velocity is generally defined as the flow of air into the fume hood per square foot of open face area of the fume hood, with the size of the open face area being dependent upon the position of one or more of the moveable doors that are provided on the front of the fume hood.

Fume hoods can be exhausted by an exhaust system including one or more blowers capable of being driven at variable speeds to increase or decrease the flow of air from the fume hood, which compensates for the varying size of the opening or face. Alternatively, there may be a single blower connected to the exhaust manifold that is in turn connected to the individual ducts of multiple fume hoods. Dampers are provided in the individual ducts to control flow therein, and to thereby modulate the flow and maintain the desired average face velocity. There may also be a combination of both of the above-described systems.

The doors of many fume hoods can be opened by raising them vertically to what is often referred to as the sash position. Alternatively, some fume hoods have a number of doors that are mounted for sliding movement in typically two sets of tracks. There are even doors that can be moved horizontally and vertically, with the tracks being mounted in a frame assembly that is vertically moveable.

In conventional damper controlled applications, fume hood duct velocity is largely a function of the damper position, and is detected by installing at least one so-called Pitot tube in the center of the duct. Each Pitot tube includes a first tube with a total pressure sensing orifice, and a second tube having a static pressure sensing orifice. The velocity pressure of air flow in the duct is calculated from the difference of the total pressure and the static pressure measured at the orifices. However, the centralized and exposed location of the Pitot tube causes it to be easily plugged with dust or other foreign matter, and thus accuracy is impaired.

Another disadvantage of conventional fume hood control systems is that the pressure differential monitoring equipment, and the damper mechanism which is used to vary the flow of air within the exhaust duct, must be installed on site during assembly of the fume hood. This procedure, which must often be performed under cramped conditions, is labor intensive and may be awkward and uncomfortable to the installer.

Thus, a first object of the present invention is to provide an improved laboratory fume hood terminal wherein the Pitot tube or other pressure differential sensing devices are disposed to avoid clogging.

Another object of the present invention is to provide an improved modular fume hood exhaust terminal which may be installed as a unit into a fume hood exhaust system with substantially much less on site labor required than in conventional installations.

SUMMARY OF THE INVENTION

Accordingly, the above-identified objects are met or exceeded by the present fume hood exhaust terminal which is installable as a working unit into a laboratory duct system. The terminal includes a duct segment with an annular ring located on an inner periphery of the duct which incrementally reduces the inner diameter of the duct. At least one and preferably a pair of gas flow sensors, pressure inputs or pressure taps, one located on either side (upstream and downstream) of the annular ring, provides a pressure differential reading which is a function of the flow rate within the duct. The dual taps are both connected to a common transmitter which provides a differential pressure value of the total and static pressures. The differential pressure value is obtained and a corresponding electrical signal is generated by a differential pressure transmitter, and the signal is transmitted to a remote controller. A damper is located within the duct downstream of the dual taps, and is under the control of a pneumatically operated actuator device. Also located on the duct segment is an analog output pressure-module which is connected to the controller and receives signals relating to the differential pressure readings to accordingly adjust the position of the damper.

More specifically, a fume hood exhaust terminal for monitoring and controlling gas flow in a duct system includes a tubular duct segment having an upstream end, a downstream end, and an inner periphery, as well as an annular ring secured to the inner periphery between the upstream and downstream ends. A differential pressure transmitter device is disposed on the duct segment for measuring the pressure differential across the ring and for generating a corresponding signal. A damper is disposed in the duct segment between the differential pressure measuring device and the downstream end, and an actuator is located on the duct segment to be responsive to the signal generated by the differential pressure transmitter device and connected to the damper for selectively controlling the position of the damper in the duct segment to maintain a specified gas velocity.

BRIEF DESCRIPTION OF THE DRAWINGS

FIG. 1 is a side elevational view of the present fume hood exhaust terminal;

FIG. 1A is a fragmentary side elevational view of an alternate embodiment of the fume hood exhaust terminal of FIG. 1;

FIG. 1B is a fragmentary side elevational view of a second alternate embodiment of the fume hood exhaust terminal of FIG. 1;

FIG. 2 is an end view of the terminal of FIG. 1;

DESCRIPTION OF THE PREFERRED EMBODIMENT

Figure 3:
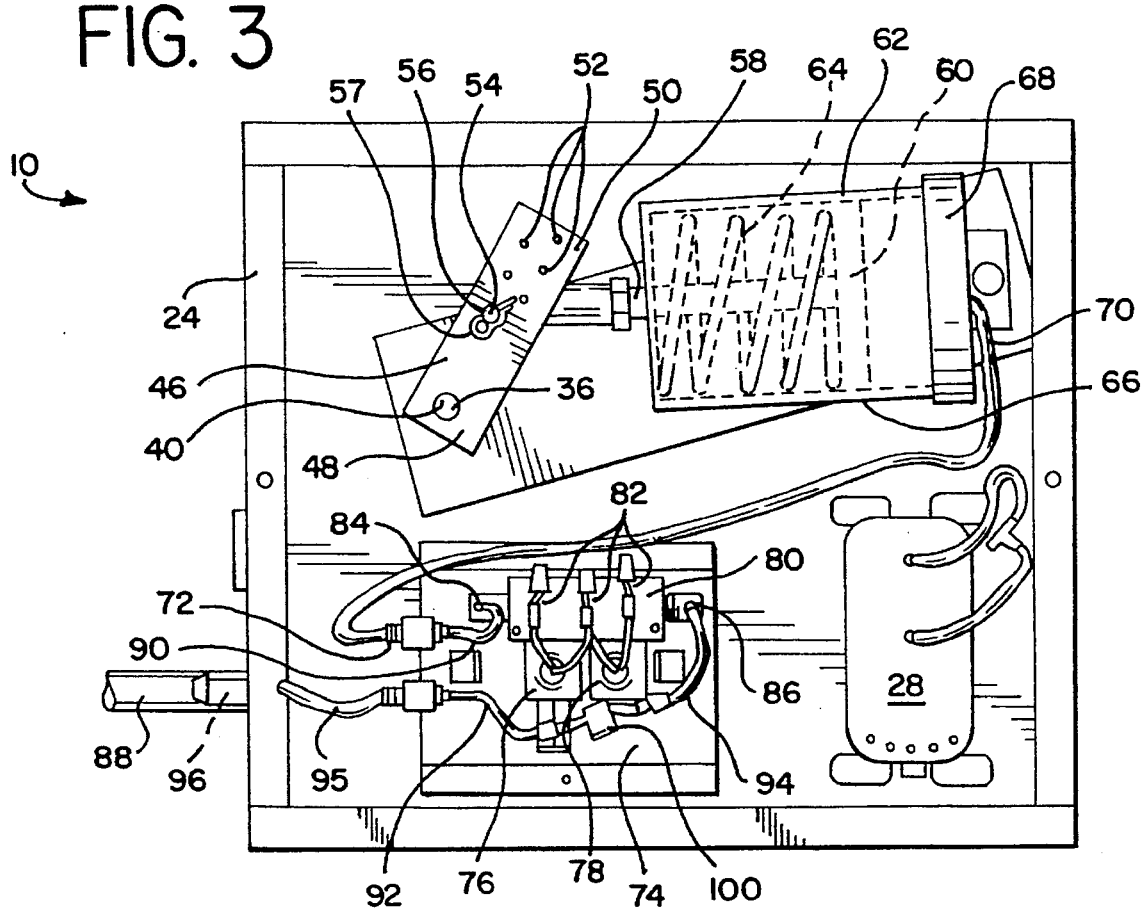
FIG. 3 is a fragmentary plan view taken along the line 3—3 of FIG. 1 and in the direction indicated.

Turning now to the drawings, and referring to FIGS. 1 and 2, the fume hood exhaust terminal of the invention is generally designated 10, and includes a tubular duct segment 12 having an upstream end 14, a downstream end 16, and an inner periphery 18. The segment 12 is preferably made of stainless steel with welded seams, but is also contemplated as being made of 18 gauge steel coated with TEFLON brand polymeric coating or other types of industrial coatings. In size, the duct segment preferably has a length which is approximately 2.5 times the diameter. The upstream end 14 is configured to be mounted directly to the exhaust conduit of a conventional fume hood (not shown).

As pictured, the upstream and downstream ends 14, 16 have a slip end configuration, but it is also contemplated that bellmouth ends 14a (best seen in FIG. 1A), or flange ends 14b (best seen in FIG. 1B) may alternately be provided, as are known in the art.

Referring now to FIGS. 2 and 3, a flattened annular ring 20 is secured to the inner periphery 18 between the upstream and downstream ends 14, 16, and in the preferred embodiment is located closely adjacent the upstream end. The ring 20 is secured to the periphery 18 to reduce the inner diameter thereof so that gas flowing through the duct segment 12 must pass over the ring and through an inner opening 22 defined thereby. Although it is contemplated that the present terminal 10 will be used for maintaining air flow in a duct system, it is also contemplated that the present terminal 10 be used in duct systems carrying other gases.

Located adjacent the duct segment 12 is an enclosure 24 preferably made of sheet metal or other sturdy material and having a removable lid 25. The enclosure 24 is secured in spaced relationship to the segment 12 by a pair of attachment blocks 26. Generally box-like in shape, the enclosure 24 is designed to contain the control components for regulating the flow of air through the duct segment 12.

Among the components located within the enclosure 24 is a differential pressure transmitter 28 used to make velocity pressure flow measurements in the duct segment. In the preferred embodiment, the transmitter 28 is a 1 inch water column (wc) range sensor with ½% of range accuracy, and the output is in the range of 4–20 ma. The transmitter 28 includes at least one and preferably two pairs of high and low pressure sensors, more commonly referred to as pressure inputs or pressure taps, respectively 30, 32, each of which is disposed on an opposite (upstream, downstream) side of the annular ring 20 for measuring the pressure differential across the ring. There are preferably two sets of these taps, each pair being spaced about 90 degrees apart from the previous pair, as seen from an end view of the duct segment 12. The transmitter 28 measures the pressure drop across the ring 20 and generates a corresponding signal known as the velocity pressure as is known in the art. Each of the pressure taps 30, 32 has an orifice and two sets of taps (not shown) for improved averaging, as well as to provide redundancy in the event of clogging. It is contemplated that additional taps may be used, and that fewer taps will decrease performance. The flow coefficients of the pressure taps 30, 32 preferably range from 60 to 85%, and most preferably range between 69–77%.

A damper 34 is disposed in the duct segment 12 between the pressure taps 30, 32 and the downstream end 16. In the preferred embodiment, the damper 34 is generally flattened and disc-shaped and is dimensioned to seal off the inner opening 22. The damper 34 is preferably rigid, and is made of stainless steel, TEFLON brand polymeric coated steel, or the equivalent. A rigid pivot shaft 36 is secured to the damper 34 along a vertical diameter by threaded fasteners 38 or other conventionally available securing devices. The shaft 36 has an upper end 40 which is rotatably engaged in a polymeric, low friction, TEFLON-type bushing 41 disposed in an opening 42 in the duct segment 12, and projects through a corresponding opening 44 and extends into the enclosure 24. A lower end 45 of the shaft 36 is rotatably engaged in an opening 45a in the duct segment 12. The degree of axial pivoting action of the shaft 36, and consequently the damper 34, is controlled by the components in the enclosure 24.

Referring now to FIG. 3, the end 40 of the shaft 36 engages a link plate 46 at a first end 48, the opposite end 50 being provided with a plurality of mounting apertures 52 in spaced arrangement. The apertures 52 provide a variety of shaft pivot points for angular selection of the position of dampers having various shapes. A pin 54 having an eyelet 56 is engaged in one of the apertures 52, and is secured by a spring clip 57 to the plate 46. The pin 54 is also secured to an end of a shaft 58 of a pneumatic piston 60 located within an actuator 62. The actuator 62 is preferably of the #3 type with an 8–13 psi spring range in a return spring 64, which circumscribes the shaft 58. A suitable actuator 62 is produced by Landis & Gyr Powers, Inc., Buffalo Grove, Ill. under part No. A.P. 331-No. 3.

The spring 64 and the piston 60 are located within a generally cylindrical actuator housing 66 which is mounted to the enclosure 24. Capping the housing 66 is an endcap 68 which has a conventional fitting (not shown) for receiving one end of a pneumatic line 70.

The opposite end of the line 70 is connected to an input nipple 72 of a control system including an Analog Output Pneumatic module (AOP) 74 which provides an electrical to pneumatic control interface for controlling the actuator 62. The AOP 74 includes a pair of solenoid valves 76, 78, each connected to a manifold body 80 which includes a plurality of electrical terminals 82. Also found in the AOP is a pair of pneumatic fittings, 84, 86, each of which is configured to engage a corresponding pneumatic supply line 88, and the actuator line 70. A relatively short jumper line 90 connects the fittings 72 and 84 together. The construction and operation of an AOP suitable for use as the AOP 74 is described in further detail in commonly assigned U.S. Pat. No. 5,174,333, which is incorporated by reference herein.

Figure 4:
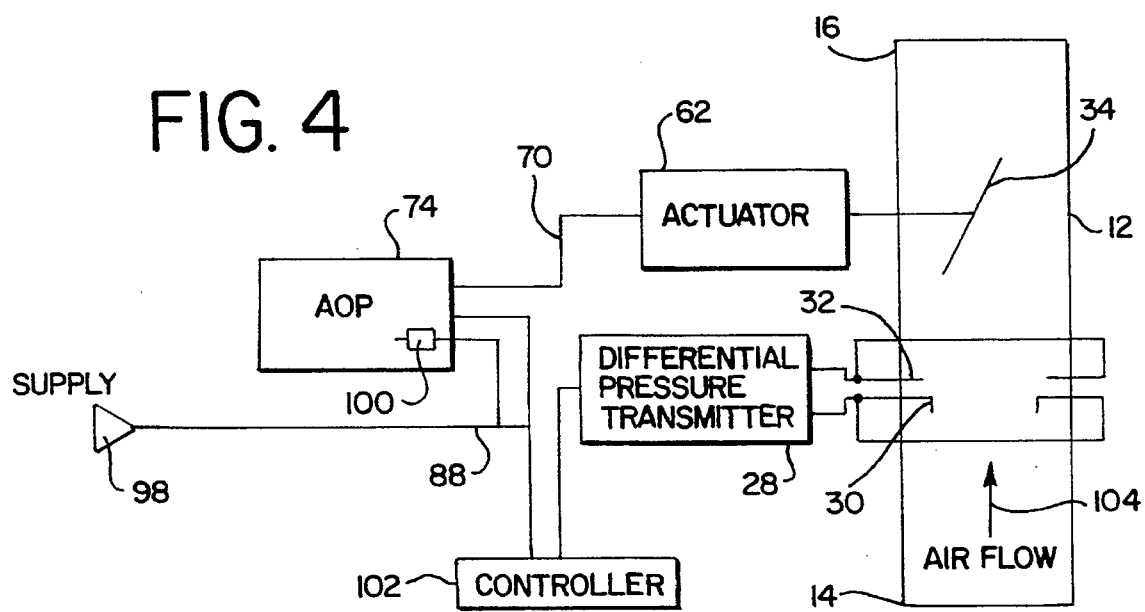
FIG. 4 is a schematic representation of the present fume hood exhaust terminal.

Referring now to FIGS. 3 and 4, the pneumatic supply line 88 is connected at one end to the pneumatic fitting 86 through a sequence of relatively smaller jumper lines 92, 94, 95, a supply nipple 96, and air filter 100 located in a wall of the AOP 74. The air filter 100 is used to protect the solenoid valves 76, 78 from dirt in the compressed air line. At its opposite end, the line 88 is connected to a pneumatic supply 98 (best seen in FIG. 4) such as a pump, which provides a supply of pressurized air to operate the actuator 62.

Both the differential pressure transmitter 28 and the AOP 74 are electrically connected to a fume hood controller 102. The fume hood controller 102 is represented schematically in FIG. 4, and a suitable example of such a controller is described in detail in U.S. Pat. No. 5,090,303, which is incorporated by reference herein. Basically, the controller receives signals generated by the differential pressure transducer 28 and sends corresponding signals to the AOP 74 to adjust the position of the damper 34.

In operation, the controller 102 receives signals generated by the differential pressure transmitter 28, which measures the velocity pressure across the taps 30, 32 to reflect the air flow through the duct segment 12, which is directly proportional to velocity. When air flow indicated by arrow 104 deviates from specified values, the position of the damper 34 must be changed accordingly. To move the damper 34, the controller 102 signals the AOP 74 to direct (or release) air to (or from) the actuator 62 through the line 70. Resulting increased pressure in the line 70 then forces the piston 60 against the return spring 64, thus adjusting the position of the damper 34 through the link plate 46 and the bracket 36. A reduction in pressure in the line 70 allows the return spring 64 to push the piston 60 toward the endcap 68, moving the damper 34 in the reverse direction.

Thus, a principal feature of the present fume hood exhaust terminal is that the entire assembly may be assembled off site at the factory, and shipped to the installation site as a unit. Once the duct segment 12 is in place in the existing duct system, only the relatively easy connection of electrical and pneumatic lines is required to complete the installation of the terminal 10. Consequently, the previously experienced tedious and cumbersome on site fitting of control system and actuator components is eliminated. In addition, the location of the sensors 30, 32 on either side of, and closely adjacent the annular ring 20, is facilitated.

Another feature of the present fume hood exhaust terminal is the use of the flow ring 20. At the ring 20, the velocity in the duct is momentarily increased on a uniform basis, which facilitates accurate sensing by the taps 30, 32. The taps are thus able to obtain a more representative average value of the air flow in the duct, as compared to Pitot tubes. Further, the location of the taps away from the duct center decreases clogging and thus improves performance.

While a particular embodiment of the fume hood exhaust terminal of the invention has been shown and described, it will be appreciated by those skilled in the art that changes and modifications may be made thereto without departing from the invention in its broader aspects and as set forth in the following claims.

What is claimed is:

1. A fume hood exhaust terminal for monitoring and controlling gas flow in a duct system, comprising:
   a tubular duct segment having an upstream end, a downstream end, and an inner periphery;
   an annular ring secured to said inner periphery between said upstream and downstream ends;
   differential pressure transmitter means disposed on said duct segment for measuring the pressure differential across said ring and for generating a corresponding signal;
   a damper disposed in said duct segment between said differential pressure measuring means and said downstream end;
   said inner periphery of said duct segment and said damper being made of TEFLON brand synthetic resin-coated steel; and,
   actuator means disposed on said duct segment and responsive to said signal generated by said differential pressure transmitter means and connected to said damper for selectively controlling the position of said damper in said duct segment to maintain a specified gas flow.

2. The fume hood exhaust terminal as defined in claim 1 wherein said differential pressure transmitting means includes a first gas flow tap located on a first side of said ring facing said upstream end and a second gas flow tap located on a second side of said ring facing said downstream end.

3. The fume hood exhaust terminal as defined in claim 1 further including controller means for controlling the operation of said actuator means, said controller means including an analog output pneumatic module.

4. The fume hood exhaust terminal as defined in claim 3 wherein said actuator means further includes an actuator mechanism connected to said analog output pneumatic module and having a reciprocating shaft for regulating the position of said damper.

5. The fume hood exhaust terminal as defined in claim 4 wherein said damper includes a pivot shaft mounted to a link plate, said link plate being connected to said reciprocating shaft of said actuator.

6. The fume hood exhaust terminal as defined in claim 5 wherein said link plate includes a plurality of mounting apertures for adjusting the amount of movement of said damper caused by a corresponding movement of said reciprocating shaft.

7. The fume hood exhaust terminal as defined in claim 1 further including a remotely located fume hood controller connected to said differential pressure transmitter to receive said signal and configured to send a corresponding signal to said actuator means for controlling the position of said damper.

8. The fume hood exhaust terminal as defined in claim 1 wherein said duct segment has a diameter, and the distance between said upstream and downstream ends is approximately 2.5 times said diameter.

9. The fume hood exhaust terminal as defined in claim wherein said first and second taps each have a flow coefficient in the range of 65–85%.

10. A fume hood exhaust terminal for monitoring and controlling gas flow in a duct system, comprising:
    a tubular duct segment having an upstream end, a downstream end, and an inner periphery;
    an annular ring secured to said inner periphery between said upstream and downstream ends;
    a first gas flow pressure tap located on a first side of said ring facing said upstream end;
    a second gas flow pressure tap located on a second side of said ring facing said downstream end;
    a damper disposed in said duct segment between said second gas flow pressure tap and said downstream end;
    said inner periphery of said duct segment and said damper being made of TEFLON brand synthetic resin-coated steel;
    differential pressure transmitter means mounted to said duct segment for monitoring pressure differential across said first and second gas flow pressure taps and for generating a resulting velocity pressure signal; and
    actuator means disposed on said duct segment for being responsive to said signal generated by said differential pressure transmitter means and being connected to said damper for selectively controlling the position of said damper in said duct segment to maintain a specified gas flow.

11. The fume hood exhaust terminal as defined in claim 10, further including a remotely located fume hood controller connected to said differential pressure transmitter to receive said signal and configured to send a corresponding signal to said actuator means for controlling the position of said damper.

* * * * *